United States Patent [19]

Champeau et al.

[11] 4,099,432
[45] Jul. 11, 1978

[54] APPARATUS FOR CONTROLLING THE POSITION OF A TEMPLATE FOR A COPYING MACHINE

[75] Inventors: Marcel Champeau; André Pelletier, both of Niort, France

[73] Assignee: Societa RAMO S.A., Niort, France

[21] Appl. No.: 787,159

[22] Filed: Apr. 13, 1977

[30] Foreign Application Priority Data

May 6, 1976 [FR] France .................. 76 13631

[51] Int. Cl.² ............................................. B23B 3/28
[52] U.S. Cl. ................................................ 82/14 A
[58] Field of Search ........................... 82/14 A, 14 C

[56] References Cited

U.S. PATENT DOCUMENTS

| 2,422,682 | 6/1947 | Johnson | 82/14 A |
| 3,014,390 | 12/1961 | Garde et al | 82/14 C |
| 3,540,330 | 11/1970 | Bruet | 82/14 A |
| 3,759,120 | 9/1973 | Iwata | 82/14 A |

Primary Examiner—Harrison L. Hinson
Attorney, Agent, or Firm—Lewis H. Eslinger

[57] ABSTRACT

A copying machine, in this case a lathe, includes a set of roughing stops carried on an indexable hub, and a fixed finishing stop. A rotary hydraulic motor is provided between a rod on which the template is rockably supported and a lever which is adapted to contact one of a series of roughing stops carried by a hub. The rod carrying the template also carries a second lever arranged to contact a micrometric finishing stop, so that the swinging of the template about the axis of the rod is controlled by selection of an appropriate one of the series of roughing stops to be engaged by the first mentioned lever.

4 Claims, 8 Drawing Figures

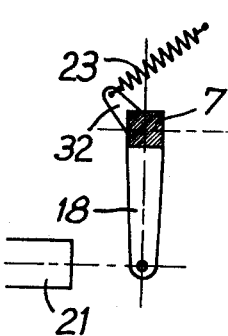
FIG.3a
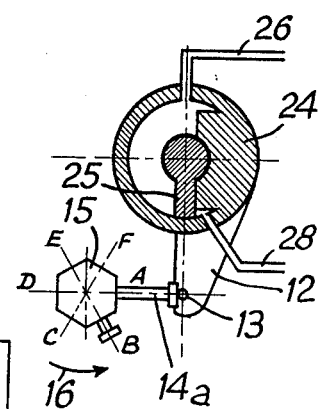
FIG.3b
FIG.3c
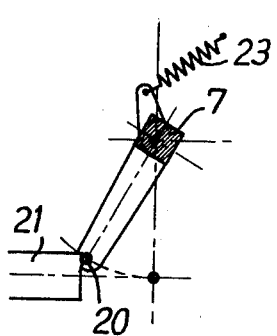
FIG.4a
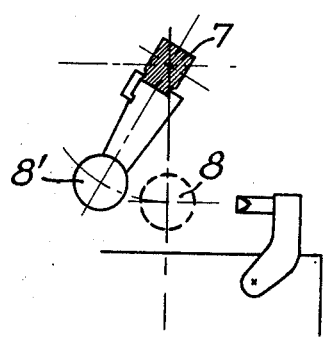
FIG.4b
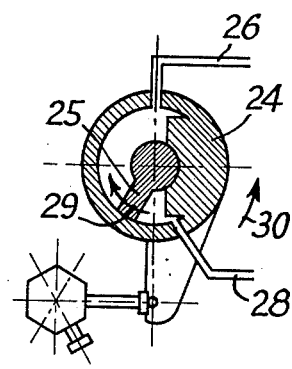
FIG.4c
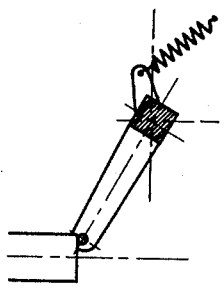
FIG.5a
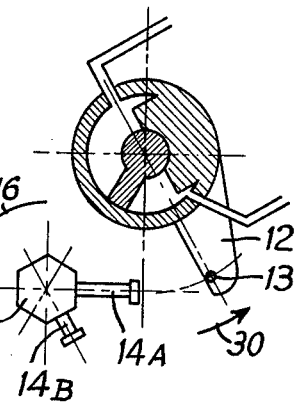
FIG.5b
FIG.5c

APPARATUS FOR CONTROLLING THE POSITION OF A TEMPLATE FOR A COPYING MACHINE

The present invention relates to an apparatus for controlling the position of a profile for a copying machine.

Apparatuses to reproduce profiles, used on machine tools in particular or on any other machine, comprise in general a hydraulic or an electronic control means. These apparatuses are based on a principle which consists in feeling the profile to be reproduced by simple contact under small pressure and to transmit all the displacement of the feeler member to the tool holder slide under strong pressure and with good precision.

It is known to associate with these apparatuses, an assembly which permits the effecting of one or several work passes by presenting the profile at a fixed distance with respect to the workpiece, in the case of a single pass machining. When it is desired to effect several machining passes, this distance is controlled by appropriate known means.

According to the invention there is provided apparatus for controlling the position of a template for a copying machine for permitting the effecting of at least one roughing pass on an adjustable stop and a finishing pass; such apparatus comprising means for holding a template; and copying apparatus comprising a feeler for control of the tool holder carriage, wherein the template holder is effective to hold the template in a rocking manner on the ends of arms whose other ends are carried by a rod rockably mounted on the frame of the machine, and said rod is driven in rotation by a drive member capable of selectively:- (a) bringing a first lever adapted to be temporarily fixed to the rod into contact with a series of said roughing stops mounted on a hub and (b) bringing a second lever fixed to the rod into contact with a micrometric precision stop for the finishing pass.

In order that the present invention, may be better understood the following description is given of one embodiment, merely by way of example, referring to the accompanying drawings in which.

Figure 2:
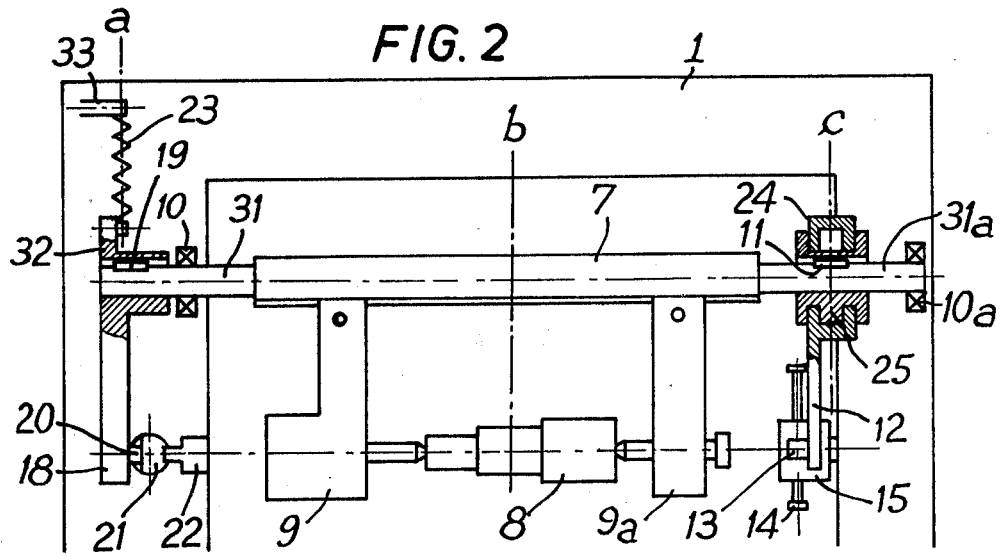
FIG. 2 is a rear view (opposite to that of the operator) in longitudinal section of a control apparatus according to the invention.
Figure 7A:
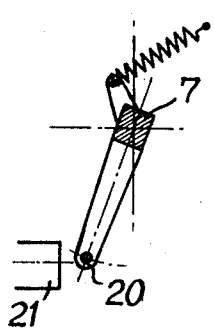
Figure 7B:
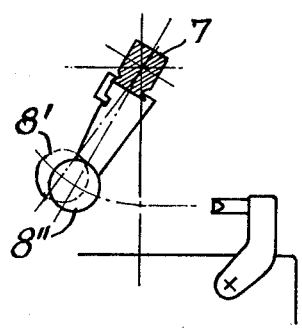
Figure 7C:
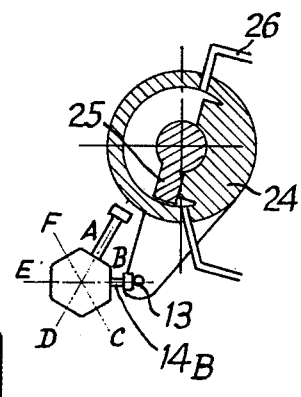
Figure 8A:
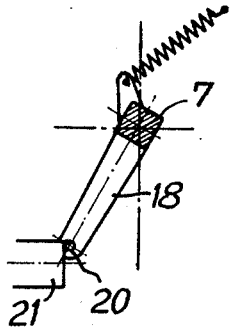
Figure 8B:
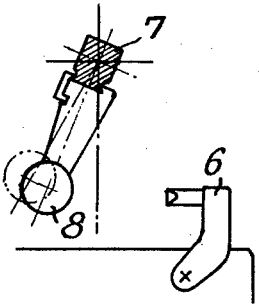
Figure 8C:
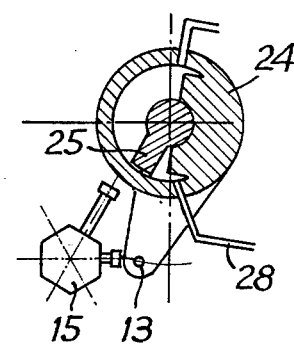

FIGS. 3, 4, 5, 6, 7, a, b, c, are transverse sections along the lines a, b, c of FIG. 2, showing the different positions of the members of the apparatus during the roughing passes; and FIGS. 8a, b, c, are transverse sections along lines a, b, c of FIG. 2, showing the position of the elements of the apparatus during the finishing pass.

Figure 1:
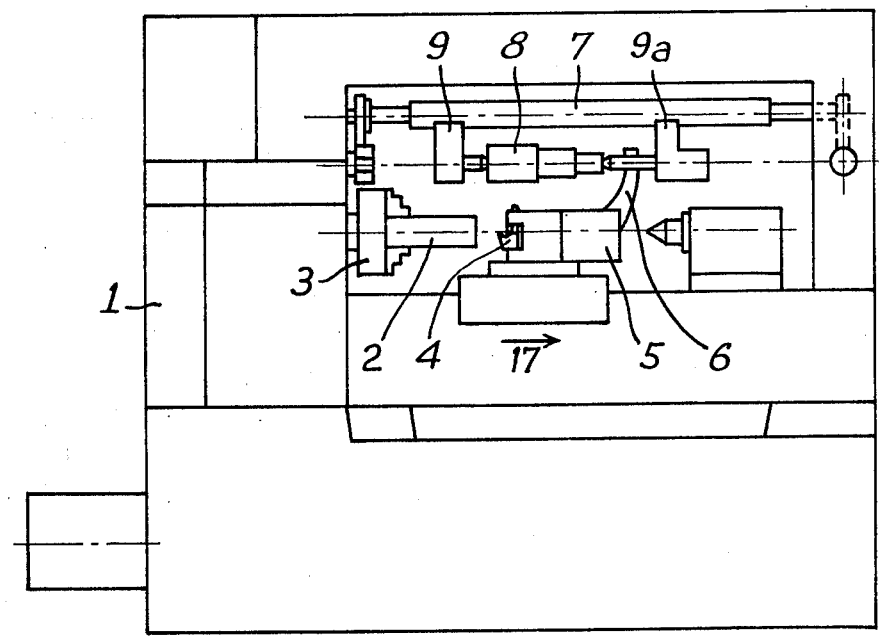
FIG. 1 is a front elevational view (operator side) of a copying lathe.

In FIG. 1, there is shown a copying lathe which comprises a frame 1 on which is rotatably mounted a chuck 3 in which is maintained fixed a workpiece 2 which is to be machined by means of a tool 4 fixed to a copying slide 5 carrying a feeler lever 6 in contact with a template 8 the profile of which is to be reproduced on the workpiece 2, as is known for copying lathes.

Displacements of the feeler 6 are transmitted to its tool carrier slide 5 by known hydraulic means, not shown in the drawings.

The template 8 (FIG. 2) is mounted between centres at the respective ends of parallel arms or tail stocks 9, 9a of which the other ends are fixed in adjustable manner on a rod 7, rockably mounted by means of bearings 10, 10a on the frame 1 of the lathe, in order to permit a certain rotational movement of the rod 7.

Between the tailstock arm 9a and the bearing 10a the rod 7 has a cylindrical part 31a which is fixed by means of a key 11 to a piston-vane 25, of a rotary hydraulic motor, (FIGS. 2 and 3c) of which the body 24 is rotatably mounted freely around the cylindrical part 31a of the rod 7. The body 24 of the hydraulic motor is fed by two fluid conduits 26, 28 which open in the body on each side of the piston-vane 25.

On the motor body 24 is fixed a first lever 12 which is provided at its end with a finger 13 capable of being applied selectively, against controllable roughing stops 14 mounted on a rotatable hub 15 (FIGS. 2, 3c).

The hub 15, rotatably mounted on the frame 1, can carry a number of roughing stops corresponding to the number of roughing passes to be effected, and in the Example shown FIGS. 3 to 8, the drum comprises six stops A, B, C, D, E, F, corresponding to the maximum of six roughing passes.

The hub 15 is driven by known means, in a step-by-step rotary motion shown by the arrow 16 (FIG. 3c), occurring between successive passes during the rapid longitudinal return movement of the slide 5 being displaced along the direction of the arrow 17.

Moreover, at its other end the rod 7 (FIGS. 2 and 3a) has between the tail stock arm 9 and the bearing 10, a cylindrical part 31 on which is fixed one of the ends of a second lever 18, by means of a key 19, the said lever 18 being provided at its other end, with a finger 20 capable of being applied against a micrometric precision stop 21 mounted on the frame 1 and which is held against rotation by a pin 22.

At its end opposite to the finger 20 the lever 18 comprises a lug 32 fixed to one of the ends of a helical tension spring 23 the other end of which is fixed on a finger 33 mounted on the lathe frame 1. The levers 12 and 18, disposed perpendicular to the rod 7, are parallel to one another and to the tailstock arms 9, 9a, carrying the template 8.

The apparatus according to the invention, functions in the following manner.

In FIGS. 3a, b, c, the second lever in zone a the template in zone b, and the first lever 12 in zone c are shown in the work position for the first roughing pass corresponding to the stop 14a. In this case, fluid under pressure is applied to the hydraulic motor 24 (FIG 3c) by the conduit 26, such that the piston vane 25 is urged into its dead centre position where it is in contact with the body 24, thus assuring the locking of the first lever 12 with the rod 7 and the application of the finger 13 of the lever 12 against the roughing stop 14a. The template 8 is in a position corresponding to the stop 14a for the first roughing pass and the feeler 6 can then come into contact with the template 8 which is then in the start position of the cycle before its displacement along the arrow 27, the connecting method of the carriage being known. At the end of this first copying pass, during the rapid return of the feeler in the sense opposite that of the arrow 27, (FIG. 4a, b, c,) the fluid under pressure which was in 26 passes along the conduit 28 by a known and programmed manner by means of the automatic control of the machine.

The lever 12 being applied against the stop 14a, the body 24 is fixed and the piston vane 25 rotates in the sense of the arrow 29 which causes pivoting of the rod 7 and of the template 8 which moves to 8' (FIG. 4). When the finger 20 arrives in contact with the micrometric stop 21, the pivoting of the rod 7 is stopped (FIGS. 4a, 5a) stopping the piston vane 25, and the feeding of the hydraulic motor with fluid under pressure continues through the conduit 28, with the resulting rotation of the body 24 (FIG. 5c) of the hydraulic motor along the arrow 30 which simultaneously moves the lever 12 and produces the engagement of the finger 13 on the stop 14a.

It is then possible to pivot the hub 15 following arrow 16 to present the stop 14b in the work position to proceed to the second roughing pass.

Figure 6A:
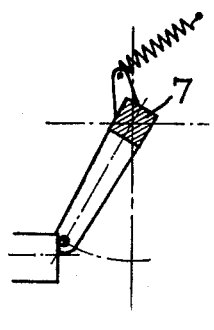

During the course of the next successive cycle shown in FIGS. 6a, b, c, the hydraulic motor 24 is again fed under pressure through the conduit 26 in such a manner as to drive the finger 13 of the lever 12, applying it against the stop 14b to obtain the respective position of the members shown in FIG. 7a, b, c.

The finger 13 is applied against the stop 14b, the piston 25 is applied against the hydraulic motor body 24, and the rockable rod 7 causes displacement of the template 8 to the position 8" (FIG. 7), the finger 20 being engaged against the micrometric screw 21.

All the members being thus positioned, it is then possible to proceed with the next traverse of the profile to be copied by means of the feeler.

Figure 6B:
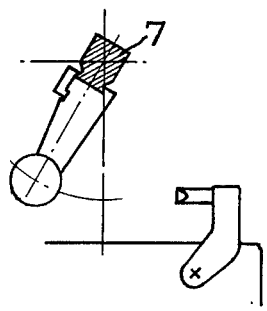
Figure 6C:
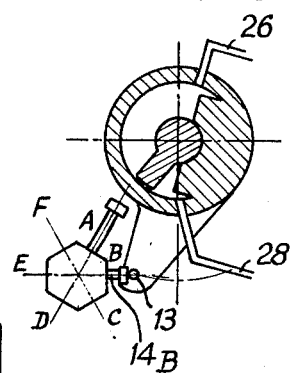

At the end of this second roughing pass and eventually of each of the roughing passes, the same cycle previously described is shown in FIGS. 4, 5, 6, a, b, c, is reproduced.

For the finishing pass shown in FIGS. 8a, b, c, which terminate the copy turning operation, the hydraulic motor 24 is fed in such a way that the finger 20 of the second lever 18 comes into contact with the micrometric stop 21.

The template 8 thus finds itself in a position corresponding to the finishing pass, and the feeler 6 can then come into contact with the template 8. During this operation, the finger 13 must not be in contact with the roughing stops 14 provided on the hub 15.

The micrometric stop 21 permits the ensuring of a very precise transverse position of the profile of the template 8 with respect to the axis of the workpiece 2.

It will be well understood that various modifications can be made by the man of the art to the apparatuses or processes which have been described, only by way of non-limited example, without leaving the scope of the invention claimed.

We claim:

1. In apparatus for controlling the position of a template for a copying machine, permitting the effecting of at least one roughing pass on an adjustable stop and a finishing pass, using a template co-operating with a feeler of a copying apparatus for the control of the tool holder carriage, the template being rockingly mounted on the ends of arms fixed at their other ends to a rod rockably mounted on the frame of the machine, the improvement comprising the rod in rotation said drive means including a drive member capable of selectively bringing in contact a first lever, means for temporarily fixing said first lever to the rod, a series of roughing stops mounted on a hub for defining the roughing passes, a second lever fixed to the rod, a micrometric precision stop for the finishing pass, and drive means effective to bring selectively said first lever into contact with one of said roughing stops or the second lever into contact with said micrometric precision stop.

2. Apparatus according to claim 1, wherein said drive means comprise a rotary hydraulic motor having a piston vane fixed to said rod and having a body rotatably mounted freely around said rod, said first lever which engages the roughing stop being carried by said body, said hydraulic motor being effective to fix said first lever to the rocking rod during the roughing phase and to release said first lever with respect to said rod for allowing displacement of the second lever and allowing indexing of said hub carrying the roughing stops.

3. Apparatus according to claim 1, and including resilient means biasing said second lever towards said micrometric stop.

4. Apparatus according to claim 1, wherein said first and second levers are disposed perpendicular to said rocking rod, and are parallel to one another and to arms carrying the template.

* * * * *